DIENE/NITRILE ELASTOMERIC BLENDS

Douglas Coulthard, Sarnia, Ontario, Canada, assignor to Polymer Corporation Limited, Sarnia, Ontario, Canada
No Drawing. Filed Nov. 21, 1969, Ser. No. 878,961
Claims priority, application Canada, Jan. 16, 1969, 40,288
Int. Cl. C08d 9/08
U.S. Cl. 260—894                    9 Claims

ABSTRACT OF THE DISCLOSURE

Improved oil-resistant vulcanizate is prepared by vulcanizing a blend of (1) a rubbery copolymer of a 2-alkyl butadiene-1,3 and an acrylic nitrile with (2) a rubbery copolymer of butadiene-1,3 and acrylonitrile. The preferred copolymer (1) is isoprene/acrylonitrile copolymer. The vulcanizate is characterized by improved tear strength, compression set and oil-aging properties and is suitable for the production of thin-walled moulded articles.

---

This invention relates to vulcanizates having good oil resistant properties. More particularly it relates to vulcanizates of compositions comprising blends of oil-resistant diene/nitrile rubbers.

Rubbery copolymers of unsaturated nitriles, such as acrylic nitriles, exemplified by acrylonitrile and methacrylonitrile, with aliphatic conjugated dienes, such as butadiene-1,3 and derivatives thereof, have been known for some considerable time. Probably their most important single property is their resistance to oils and this property is utilized in a number of applications such as in seals, O-rings, diaphragms, hoses and gaskets where exposure to oils is frequent and resistance to their degradative properties is most important. The commercial diene/nitrile copolymers have hitherto almost exclusively been copolymers of acrylonitrile with butadiene, the acrylonitrile being employed usually in a minor proportion of from 20 to 45 molar percent. One problem which is associated with the use of butadiene/acrylonitrile copolymer elastomers in the preparation of vulcanized shaped articles, such as seals, O-rings, hoses, gaskets and diaphragms, which are often thin-walled and intricately shaped, is that the articles are frequently torn when being removed from mold or mandrel after cure. The reject rate of such articles can be undesirably high and improvements in the tear strength of butadiene/acrylonitrile vulcanizates are constantly being sought.

Vulcanized shaped articles from butadiene/acrylonitrile copolymers are in use not only exposed to oil in many of their applications but also frequently are exposed to strong compressive forces, particularly when being used as seals and gaskets. This being the case it is desirable for the articles to demonstrate good compression recovery properties and low compression set in addition to good oil-aging properties. While butadiene/acrylonitrile copolymers have, on balance, quite good such properties it would be most advantageous to improve both the compression resistance properties and oil-aging properties of shaped articles formed from them where the conditions of use of the articles are onerous and the consequences of failure serious.

The present invention provides oil-resistant vulcanizates comprising blends of rubbery diene/nitrile copolymers having improved tear strength, compression-set and oil-aging properties.

The oil-resistant vulcanizates of the invention are vulcanized compositions comprising a blend of from 20 to 80 parts by weight of (1) a rubbery copolymer of a 2-alkyl butadiene-1,3 and an acrylic nitrile with from 80 to 20 parts by weight of (2) a rubbery copolymer of a straight chain conjugated aliphatic diene of from 4 to 8 carbon atoms and an acrylic nitrile.

The rubbery copolymer (1) is defined as a copolymer of a 2-alkyl butadiene-1,3 and an acrylic nitrile. The alkyl substituent in the 2-alkyl butadiene-1,3 may be an alkyl radical containing 1 to 5 carbon atoms such as methyl, ethyl, isopropyl, and butyl. Representative examples of 2-alkyl butadiene-1,3 are 2-ethyl butadiene-1,3 and isoprene, which latter is preferred. The acrylic nitrile, which is present in the copolymer preferably in the proportion of from 45 to 20 molar percent, is an acrylic nitrile having the general formula

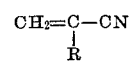

where R is hydrogen, $C_1$ to $C_3$ alkyl radical, halogen or cyanide. Representative examples are acrylonitrile, which is preferred, methacrylonitrile, and chloroacrylonitrile. The nitrile copolymer (1) preferably contains about 60 to 75 mole percent of 2-alkyl butadiene-1,3 units and about 25 to 40 mole percent of the acrylic nitrile units. The nitrile copolymer (1) is a high molecular weight, normally solid polymer having a Mooney viscosity (ML–4' at 100° C.) of about 40 to 150, usually in the range of 50 to 75.

Correspondingly the rubbery copolymer (2) is defined as a copolymer of a straight chain conjugated aliphatic diene of from 4 to 8 carbon atoms and an acrylic nitrile. The conjugated diene may be, for example, butadiene-1,3 which is preferred, piperylene or hexadiene-1,3. The acrylic nitrile which is copolymerized with the conjugated diene may be defined by the same general formula

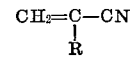

given above. Acrylonitrile again is the preferred such acrylic nitrile. The nitrile may be present in the proportion 20 to 45 molar percent, especially 25 to 40 molar percent, of the copolymerized monomers in rubbery copolymer (2). The nitrile copolymer (2) also is a high molecular weight, normally solid polymer having a Mooney viscosity (ML–4' at 100° C.) of about 40 to 150, preferably 45 to 85.

The two rubbery copolymers are blended in the proportions of from 20 to 80 parts by weight of copolymer (1) with from 80 to 20 parts by weight of copolymer (2), preferred blends comprise from 60 to 40 parts by weight of copolymer (1) and 40 to 60 parts by weight of copolymer (2). The blend of approximately equal amounts by weight of the two copolymers shows some particularly interesting properties.

The two rubbery copolymers which are blended in accordance with the invention may be blended on any conventional rubber mixing equipment such as a two-roll open mill or an internal Banbury-type mixer. The order in which the copolymers are fed to the mixing equipment is not critical and if desired the two polymers may be fed together. Various compounding and vulcanizing ingredients may be added to the blend when it has been formed or may be added initially to the mixer with the rubbery copolymers. Conventionally, these ingredients may be comprised of fillers such as clays, silica, titanium oxide, carbon black; softeners-plasticizers such as hydrocarbon oils, chlorinated oils, non-volatile esters; natural and/or synthetic resins; antioxidants, stabilizers and vulcanizing agents such as zinc oxide, an oxide of a Group II metal of the Periodic Table, sulfur or their mixtures in combination with accelerators or retarders such as mercaptoimidazoline, diorthotolyl guanidine, benzothiazyl disulfide. The compounded stock thus prepared may be shaped and vulcanized in accordance with conventional practice to produce the desired shaped article.

The following examples, in which parts are by weight unless otherwise specified, serve to illustrate the invention:

EXAMPLE 1

The properties of a number of blends of an isoprene/acrylonitrile copolymer with a butadiene/acrylonitrile copolymer were studied and compared with the properties of control formulations comprising, on the one hand, the isoprene/acrylonitrile copolymer as the sole elastomeric ingredient and on the other hand, the butadiene/acrylonitrile copolymer as the sole elastomeric ingredient. In each case the formulation which was used was:

| Ingredient: | Parts by Wt. |
|---|---|
| Polymer | 100.0 |
| Sulfur | 0.2 |
| Zinc oxide | 5.0 |
| Reaction product of diphenylamine and acetone [1] (antioxidant) | 2.0 |
| Carbon black (high abrasion furnace) | 50.0 |
| High molecular weight polyether plasticizer [2] | 15.0 |
| Benzothiazole disulfide (accelerator) | 2.5 |
| Tetramethyl thiuram disulfide (accelerator) | 2.0 |
| Total | 176.7 |

[1] S.G. 1.13; M.P. range 85–95° C.
[2] "Thiokol TP-90B," registered trademark, liquid boiling in the range 660°–760° F. at 760 mm. Hg, S.G. 0.967.

The ingredients were mixed in an internal Banbury-type mixer at a temperature of 150° F. (60° C.) operating at 77 r.p.m. and starting with steam and water off. The polymer, sulphur and zinc oxide were added initially and after two minutes half of the carbon black and half of the plasticizer were added and the water turned on to cool the rotor and chamber. The remaining carbon black and plasticizer were added after a further one and a half minutes. After five minutes total mixing the ram was brushed down and the mixture was dumped after six minutes mixing. The remaining ingredients (accelerators) were added on a cold mill and the blend was refined.

The formulations were then moulded and vulcanized for 15 minutes at 166° C. Test specimens were prepared from the vulcanizates and subjected to a variety of tests. The results of the tests are summarized in Table I which follows.

TABLE I

|  | Control 1 | Blend 1 | Blend 2 | Blend 3 | Control 2 |
|---|---|---|---|---|---|
| Isoprene acrylonitrile copolymer [1] (phr.) | 100 | 75 | 50 | 25 | 0 |
| Butadiene-1,3/acrylonitrile copolymer [2] (phr.) | 0 | 25 | 50 | 75 | 100 |
| Compound properties: |  |  |  |  |  |
| Compound viscosity (ML-4' at 100° C.) | 27 | 35 | 34 | 33 | 32 |
| Mooney scorch time (min. at 125° C.) | 20 | 24 | 25 | 25 | 225 |
| Garvie die extrusion rate (cm./min.) | 346 | 336 | 338 | 305 | 292 |
| Unaged vulcanizate properties: |  |  |  |  |  |
| Cured 15 min. at 165° C. hardness, Shore A₂ | 62 | 62 | 60 | 60 | 58 |
| Modulus at 100% elongation (kg./cm.) [2] | 17 | 15 | 13 | 11 | 13 |
| Modulus at 300% elongation (kg./cm.) [2] | 89 | 81 | 74 | 65 | 60 |
| Tensile strength (kg./cm.) [2] | 222 | 218 | 200 | 181 | 169 |
| Elongation at break (percent) | 590 | 630 | 620 | 630 | 640 |
| Compression set, ASTM B (percent): |  |  |  |  |  |
| 70 hours at 100° C | 27 | 24 | 21 | 23 | 26 |
| 22 hours at 100° C | 17 |  | 13 |  | 17 |
| Tear strength, die C at room temp. (kg./cm.) | 50 | 48 | 48 | 50 | 45 |
| 70° C | 48 | NT | 41 | NT | 32 |
| 100° C | 37 | NT | 27 | NT | 20 |
| 121° C | 27 | NT | 21 | NT | 18 |
| Aged vulcanizate properties, cured 15 min. at 165° C., aged in air for 168 hr. at 100° C., change: |  |  |  |  |  |
| Hardness Shore A₂ inst. (pts.) | +13 | +12 | +13 | +12 | +12 |
| Tensile strength (percent) | −7 | +15 | +17 | +11 | +17 |
| Elongation at break (percent) | −30 | −25 | −18 | −20 | −16 |
| Aged in air for 168 hr. at 120° C., change: |  |  |  |  |  |
| Hardness, Shore A₂ inst. (pts.) | +27 | +26 | +26 | +26 | +24 |
| Tensile strength (percent) | −20 | −14 | −8 | −3 | +10 |
| Elongation at break (percent) | −71 | −69 | −70 | −67 | −64 |
| Aged in ASTM Oil #3 for 70 hr. at 100° C., change: |  |  |  |  |  |
| Hardness, Shore A₂ inst. (pts.) | +1 | −2 | −2 | −3 | −3 |
| Tensile strength (percent) | −9 | −4 | −2 | −5 | −7 |
| Elongation at break (percent) | −17 | −16 | −6 | −9 | −17 |
| Volume change (percent) | +7 | +8 | +9 | +9 | +11 |
| Aged in ASTM Fuel B for 70 hr. at 25° C., change: |  |  |  |  |  |
| Hardness, Shore A₂ inst. (pts.) | −14 | −15 | −16 | −18 | −16 |
| Tensile strength (percent) | −45 | −44 | −35 | −45 | −50 |
| Elongation at break (percent) | −29 | −24 | −20 | −29 | −31 |
| Volume change (percent) | +23 | +24 | +25 | +26 | +29 |

[1] The isoprene/acrylonitrile copolymer used was Krynac 833, registered trademark, having a bound acrylonitrile content of about 34% by weight and a Mooney viscosity (ML-4' at 100° C.) of about 70.
[2] The butadiene/acrylonitrile copolymer used was Krynac 803, registered trademark, having a bound acrylonitrile content of about 34% by weight and a Mooney viscosity (ML-4' at 100° C.) of about 47.

It can be seen from the results presented above in Table I that the blending of the isoprene/acrylonitrile copolymer with the butadiene/acrylonitrile copolymer increases the hardness, modulus and tensile strength over Control 2 (butadiene/acrylonitrile copolymer) and only slightly decreases the elongation at break. There is a very significant improvement in the hot tear strength when isoprene/acrylonitrile copolymer is used instead of butadiene/acrylonitrile copolymer. This, as discussed above, will make possible the production of various thin-walled, moulded shaped articles from oil-resistant copolymers with a much reduced reject rate resulting from poor hot tear properties. The compression set properties of the blends show a most unexpected result with a synergistic improvement being demonstrated by reduced compression set figures. The compression set values exhibit a minimum in the region of a 50/50 blend of isoprene/acrylanitrile copolymer and butadiene/acrylonitrile copolymer. Since in many applications diene/nitrile rubbery copolymers are under high compressive forces, this surprising manifestation of synergism in the compression set properties will readily be utilized to improve the sealing properties of such articles as gaskets, O-rings and the like.

As indicated in Table I, the vulcanizates of both the isoprene/acrylonitrile copolymer and butadiene/acrylonitrile copolymer tended to harden upon heat aging in air. However, the blend vulcanizates containing both copolymers did not undergo surface hardening or embrittlement as a result of oxygen attack in contrast to the vulcanizates of Control 2. This property may be utilized in, for example, printing rolls to eliminate glaze-wear or surface polishing with consequent loss of ink retention.

When the properties of the vulcanizates aged in oil or fuel are examined it can again be seen that the Blends 1, 2 and 3 all show an unexpected improvement in their retention of tensile strength and elongation at break over both Controls 1 and 2. Better retention of these original properies for the blends than could have been expected from the properties of the control compounds makes possible the production of high quality shaped articles of improved oil-resistance.

EXAMPLE 2

As in Example 1, the properties of a number of blends were examined and compared with the properties of control samples. The formulation used in this example was as follows:

| Ingredients: | Parts |
|---|---|
| Polymer | 100 |
| Sulfur | 1.25 |
| Zinc oxide | 5.00 |
| Stearic acid | 1.00 |
| Polymerized trimethyl hydroquinone [1] (antioxidant) | 2.00 |
| MT carbon black | 50.00 |
| FEF carbon black | 50.00 |
| Triglycol ester of vegetable oil fatty acid [2] (plasticizer) | 8.00 |
| Tricresyl phosphate (plasticizer) | 5.00 |
| Tetramethyl thiuram monosulfide (accelerator) | 0.50 |
| Total | 222.75 |

[1] Agerite Resin D, registered trademark.
[2] A liquid having a specific gravity of 0.97 and a viscosity at 20° C. of 95 Saybolt seconds.

The ingredients were mixed in Banbury mixer under the conditions specified in Example 1. The rubbery polymer was added at start up, the sulfur after 30 seconds and the zinc oxide, stearic acid, antioxidant, half of the carbon black and half of the plasticizer after one minute. The remaining carbon black and plasticizer were added after two and a half minutes. After four minutes mixing the ram was brushed down and the mixture dumped after five minutes. The accelerator was added on a cold mill and the blend refined.

The blends were then tested to determine their mould knitting properties. An uncured slab of dimensions 0.76 cm. x 7.63 cm. x 11.2 cm. was placed at each end of a preheated mould of dimensions 0.63 cm. x 7.63 cm. x 22.8 cm. leaving a gap of 0.6 cm. between the slabs. A preheated cover was then placed on the mould and the assembly was press-cured for seven minutes at 166° C. Being thicker than the mould cavity, the slabs flowed together during cure. The tensile strength of the fusion joint in the cured sample was then measured. The results were:

| | Control 1 | Blend 1 | Blend 2 | Blend 3 | Control 2 |
|---|---|---|---|---|---|
| Isoprene/acrylonitrile copolymer [1] | 100 | 75 | 50 | 25 | |
| Butadiene/acrylonitrile copolymer [2] | | 25 | 50 | 75 | 100 |
| Tensile strength (kg./cm.²) | 86 | 79 | 79 | 73 | 52 |

[1] [2] As in Example 1.

As can be seen from these results the blending of the isoprene/acrylonitrile copolymers with the butadiene acrylonitrile copolymer results in a marked improvement of the knitting or joint strength of the compounds as campared with the use of the butadiene/acrylonitrile copolymer alone.

The present invention can be seen to provide oil-resistant vulcanizates which exhibit a variety of desirable properties. The improvements in tear strength, surface embrittlement, compression set and retention of tensile properties on oil-aging demonstrated by the vulcanized blends of the 2-alkyl butadiene-1,3 and acrylic nitrile rubbery copolymer with the straight chain conjugated diene and acrylic nitrile rubbery copolymer, make possible the production of a wide variety of vulcanized shaped articles of significantly improved properties over the articles hitherto available from conventional diene/nitrile copolymer vulcanizates.

What we claim is:

1. An improved oil-resistant vulcanizate comprising a vulcanized composition containing a blend of from 20 to 80 parts by weight of (1) a high molecular weight rubbery copolymer of 2-alkyl butadiene-1,3 and an acrylic nitrile with from 80 to 20 parts by weight of (2) a rubbery copolymer of a straight chain conjugated aliphatic diene of from 4 to 8 carbon atoms and an acrylic nitrile; the molar proportion of said diene to acrylic nitrile in each of copolymers (1) and (2) being from 55/45 to 80/20.

2. The vulcanizate according to claim 1 wherein the rubbery copolymer (1) is a copolymer of isoprene and acrylonitrile.

3. The vulcanizate according to claim 2 wherein the isoprene/acrylonitrile copolymer has a Mooney viscosity (ML-4' at 100° C.) of from about 50 to 75.

4. The vulcanizate according to claim 1 wherein the rubbery copolymer (2) is a copolymer of butadiene-1,3 and acrylanitrile.

5. The vulcanizate according to claim 4 wherein the butadiene/acrylonitrile copolymer has a Mooney viscosity (ML-4' at 100° C.) of from about 45 to 85.

6. The vulcanizate according to claim 1 wherein the blend contains from 60 to 40 parts by weight of copolymer (1) and from 40 to 60 parts by weight of copolymer (2).

7. The vulcanizate according to claim 1 wherein the composition contains filler and plasticizer.

8. A shaped rubber article of the oil-resistant vulcanizate as claimed in claim 1.

9. The article according to claim 8 in the form of seals, O-rings, hoses, diaphragms or gaskets.

References Cited

UNITED STATES PATENTS 3,400,086   9/1968   Orr _____ 260—5
2,505,349   4/1950   Daly _____ 260—45.5

MURRAY TILLMAN, Primary Examiner

C. J. SECCURO, Assistant Examiner

U.S. Cl. X.R.

260—23.7 M, 30.6 R, 33.2 R, 33.6 AQ, 33.8 UA, 41 A, 41 R, 41 B, 45.8 N, 745 B